United States Patent
Li et al.

(10) Patent No.: US 12,520,333 B2
(45) Date of Patent: Jan. 6, 2026

(54) UPLINK TRANSMISSION METHOD AND TERMINAL

(71) Applicant: VIVO MOBILE COMMUNICATION CO., LTD., Guangdong (CN)

(72) Inventors: Na Li, Guangdong (CN); Xueming Pan, Guangdong (CN); Lei Jiang, Guangdong (CN); Xiaodong Shen, Guangdong (CN)

(73) Assignee: VIVO MOBILE COMMUNICATION CO., LTD, Guangdong (CN)

( * ) Notice: Subject to any disclaimer, the term of this patent is extended or adjusted under 35 U.S.C. 154(b) by 379 days.

(21) Appl. No.: 17/700,828

(22) Filed: Mar. 22, 2022

(65) Prior Publication Data

US 2022/0217708 A1     Jul. 7, 2022

Related U.S. Application Data

(63) Continuation of application No. PCT/CN2020/117711, filed on Sep. 25, 2020.

(30) Foreign Application Priority Data

Sep. 25, 2019   (CN) .................. 201910914009.6

(51) Int. Cl.
   *H04W 72/51*     (2023.01)
(52) U.S. Cl.
   CPC .................................. *H04W 72/51* (2023.01)
(58) Field of Classification Search
   CPC .................................................. H04W 72/51
   See application file for complete search history.

(56) References Cited

U.S. PATENT DOCUMENTS

| 2018/0167823 A1* | 6/2018 | Uchino ................. H04W 72/23 |
| 2019/0261454 A1 | 8/2019 | Xiong et al. |
| 2019/0281587 A1 | 9/2019 | Zhang et al. |
| 2019/0296954 A1 | 9/2019 | Xing et al. |

(Continued)

FOREIGN PATENT DOCUMENTS

| CN | 108064049 A | 5/2018 |
| CN | 109698738 A | 4/2019 |

(Continued)

OTHER PUBLICATIONS

Apple Inc., "Slot Format Indicator in Group-common PDCCH", R1-1720118, 3GPP TSG-RAN WG1 #91, Nov. 27-Dec. 1, 2017, Reno, USA.

(Continued)

*Primary Examiner* — Michael Thier
*Assistant Examiner* — Nevena Zecevic Sandhu
(74) *Attorney, Agent, or Firm* — Price Heneveld LLP

(57) ABSTRACT

This application provides an uplink transmission method and a terminal. The uplink transmission method includes: determining, based on at least one of the following, a terminal behavior pattern: configuration information of the terminal, received downlink control information, whether a serving cell in which first information is located is a licensed band, and whether a serving cell in which a first uplink transmission is located is a licensed band; and performing an uplink transmission based on the terminal behavior pattern.

17 Claims, 7 Drawing Sheets

(56) References Cited

U.S. PATENT DOCUMENTS

| | | | |
|---|---|---|---|
| 2019/0386780 A1* | 12/2019 | Zou | H04L 1/1864 |
| 2020/0145997 A1* | 5/2020 | Luo | H04W 16/02 |
| 2020/0337069 A1 | 10/2020 | Jiang et al. | |
| 2021/0007128 A1* | 1/2021 | Bhattad | H04W 16/14 |
| 2021/0235477 A1* | 7/2021 | Baldemair | H04W 72/21 |
| 2021/0385863 A1* | 12/2021 | Fan | H04W 74/008 |
| 2022/0295478 A1* | 9/2022 | Murayama | H04L 5/0073 |

FOREIGN PATENT DOCUMENTS

| | | | |
|---|---|---|---|
| CN | 109699084 A | | 4/2019 |
| CN | 109803409 A | | 5/2019 |
| CN | 110166202 A | | 8/2019 |
| WO | 2018231621 A1 | | 12/2018 |

OTHER PUBLICATIONS

Wilus Inc., "Remaining issues on group-common PDCCH for NR", R1-1720874, 3GPP TSG RAN WG1 Meeting 91, Nov. 17-Dec. 1, 2017, Reno, USA.

* cited by examiner ial Application No. PCT/CN2020/117711 filed on Sep. 25, 2020, which claims priority to Chinese Patent Application No. 201910914009.6, filed in China on Sep. 25, 2019, which are incorporated herein by reference in their entireties.

TECHNICAL FIELD

This application relates to the field of communications technologies, and in particular, to an uplink transmission method and a terminal.

BACKGROUND

Currently, if a terminal such as user equipment (UE) is configured to monitor for a slot format indicator (SFI) transmitted through a physical downlink control channel (PDCCH), that is, configured to monitor for an SFI PDCCH, and a configured uplink transmission is configured on a flexible symbol indicated by a semi-static slot format configuration, or the UE has no semi-static slot format configuration, the UE cannot transmit the configured uplink transmission in a case that no SFI PDCCH is detected. However, an unlicensed band, a base station needs to perform clear channel detection before transmitting the SFI PDCCH, and can transmit the SFI PDCCH only when the channel is clear; otherwise, the base station cannot transmit the SFI PDCCH. If the base station transmits no SFI PDCCH, the UE cannot transmit the configured uplink transmission, thereby reducing an occasion of preempting the channel by the UE, affecting the uplink transmission, and resulting in low uplink transmission efficiency of the existing UE.

SUMMARY

Embodiments of this application provide an uplink transmission method and a terminal.

According to a first aspect, an embodiment of this application provides an uplink transmission method, applied to a terminal and including:

determining, based on at least one of the following, a terminal behavior pattern: configuration information of the terminal, received downlink control information, whether a serving cell in which first information is located is a licensed band, and whether a serving cell in which a first uplink transmission is located is a licensed band, where the first information is information to be monitored by the terminal within a monitoring periodicity, and the first uplink transmission is at least one of a configured uplink transmission and a dynamically scheduled uplink transmission; and performing an uplink transmission based on the terminal behavior pattern.

According to a second aspect, an embodiment of this application provides a terminal, including:

a determining module, configured to determine, based on at least one of the following, a terminal behavior pattern: configuration information of the terminal, received downlink control information, whether a serving cell in which first information is located is a licensed band, and whether a serving cell in which a first uplink transmission is located is a licensed band, where the first information is information to be monitored by the terminal within a monitoring periodicity, and the first uplink transmission is at least one of a configured uplink transmission and a dynamic scheduled uplink transmission; and a transmission module, configured to perform an uplink transmission based on the terminal behavior pattern.

According to a third aspect, an embodiment of this application further provides a terminal, including a memory, a processor, and a computer program stored in the memory and capable of running on the processor, where when the computer program is executed by the processor, the steps of the foregoing uplink transmission method are implemented.

According to a fourth aspect, an embodiment of this application further provides a computer-readable storage medium, where a computer program is stored in the computer-readable storage medium, and when the computer program is executed by a processor, the steps of the foregoing uplink transmission method are implemented.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from these accompanying drawings without creative efforts.

DESCRIPTION OF EMBODIMENTS

Figure 1:
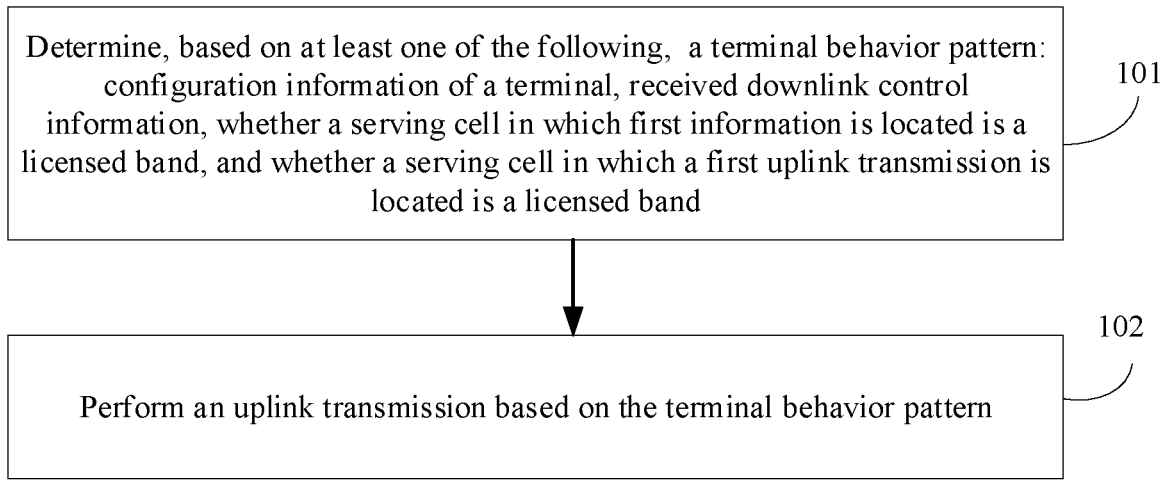
FIG. 1 is a flowchart of an uplink transmission method according to an embodiment of this application.

FIG. 1 is a flowchart of an uplink transmission method according to an embodiment of this application. The method is applied to a terminal. As shown in FIG. 1, the method includes the following steps.

Step 101: Determine, based on at least one of the following, a terminal behavior pattern: configuration information of the terminal, received downlink control information, whether a serving cell in which first information is located is a licensed band, and whether a serving cell in which a first uplink transmission is located is a licensed band.

The first information is information to be monitored by the terminal within a monitoring periodicity. The first uplink transmission is at least one of a configured uplink transmission and a dynamic scheduled uplink transmission.

Step 102: Perform an uplink transmission based on the terminal behavior pattern.

For ease of understanding, contents for determining the terminal behavior pattern are described in the following.

(1) Configuration Information of the Terminal

Optionally, when determining, based on its configuration information, the terminal behavior pattern, the terminal may directly make a determination based on radio resource control (RRC) configuration information, or may implicitly make a determination based on other configurations, for example, make a determination based on whether the terminal currently adopts a frame based equipment (FBE) operation or a load based equipment (LBE) operation.

For FBE, a periodic structure is used for transmitting and receiving timings of the equipment, and its periodicity is a fixed frame period (FFP). An LBT based channel access mechanism is used for the FBE device to preempt a channel A device that initiates a transmission sequence of one or more consecutive transmissions is denoted as an initiating device, and other devices are denoted as responding devices. The FBE device may be an initiating device or a responding device, or supports functions of the two devices.

For an LBE operation, a transmission device can start to perform LBT at any occasion, and perform transmission until a channel is detected clear. For the transmission device, there is no fixed listening time. When a channel is detected to be busy, the transmission device does not need to skip the channel, but can continue listening by backing off several eCCAs until a value of a counter for counting the eCCA is zero.

(2) Received Downlink Control Information DCI

Optionally, the DCI indicator is generally only applicable to a dynamic scheduled uplink transmission, or, a type 2 configured grant physical uplink shared channel (PUSCH), and is determined based on its scheduled uplink transmission/an uplink grant corresponding to a type 2 CG PUSCH/indication information in an activated DCI.

(3) Whether a Serving Cell in which First Information is Located is a Licensed Band Optionally, the first information is information to be monitored by the terminal within a monitoring periodicity. The first information may be at least one of the following: an SFI transmitted through a PDCCH (that is, an SFI PDCCH), channel occupancy time (COT) indication information, an initial signal, a preamble signal, and the like. The first information may be transmitted in the form of a physical channel, such as a PDCCH, or may be transmitted in the form of a physical signal, such as a PDCCH DMRS, a PDSCH DMSR, a CSI-RS, and a ZC sequence.

For (3), in a case that the serving cell in which the first information (for example, the SFI PDCCH, the COT indication information, the initial signal and the preamble signal) is located (that is, the serving cell that transmits the first information) is a licensed band, the terminal may determine that its behavior pattern is a first terminal behavior, in other words, the first terminal behavior is used; or in a case that the serving cell in which the first information (for example, the SFI PDCCH) is located is an unlicensed band, the terminal may determine that its behavior pattern is a second terminal behavior, in other words, the second terminal behavior is used.

(4) Whether a Serving Cell in which a First Uplink Transmission is Located is a Licensed Band Optionally, the first uplink transmission is at least one of a configured uplink transmission and a dynamic scheduled uplink transmission.

For (4), in a case that the serving cell in which the first uplink transmission is located is a licensed band, the terminal can determine that its behavior pattern is a first terminal behavior, in other words, the first terminal behavior is used; or, in a case that the serving cell in which the first uplink transmission is located is an unlicensed band, the terminal may determine that its behavior pattern is a second terminal behavior, in other words, the second terminal behavior is used.

It can be understood that in the uplink transmission method in this embodiment of this application, by determining the terminal behavior pattern and performing the uplink transmission based on the terminal behavior pattern, the terminal can use different uplink transmission modes according to corresponding configurations and/or actual situations. This increases uplink transmission occasions of the terminal, improves throughput and delay of the uplink transmission, and improves efficiency of the uplink transmission.

In this embodiment of this application, the terminal behavior pattern is any one of the first terminal behavior and the second terminal behavior.

Optionally, the first terminal behavior may include: in a case that the terminal detects no first information within the monitoring periodicity, canceling transmitting a first uplink transmission that is within the monitoring periodicity, that is, at least one of a configured uplink transmission and a dynamic scheduled uplink transmission. For the first terminal behavior, the first information may be at least one of the following: an SFI transmitted through a PDCCH (that is, an SFI PDCCH), channel occupancy time (COT) indication information, an initial signal, a preamble signal, and the like. The configured uplink transmission may be configured by using higher layer signaling such as RRC signaling. The dynamic scheduled uplink transmission is applicable to cross-FFP scheduling, which means that scheduling information corresponding to the uplink transmission is received in an FFP before the FFP in which the uplink transmission is located.

In an implementation, for the first terminal behavior, the corresponding monitoring periodicity is an SFI monitoring periodicity. The SFI monitoring periodicity is, for example, a PDCCH monitoring periodicity for DCI format 2_0 (a PDCCH monitoring periodicity for DCI format 2_0); and the first information to be monitored within the SFI monitoring periodicity is an SFI transmitted through a PDCCH. In addition, if the SFI is transmitted through a group-common PDCCH (for example, DCI format 2_0), the SFI monitoring periodicity is a monitoring periodicity of the group-common PDCCH corresponding to the SFI.

In another implementation, for the first terminal behavior, the corresponding monitoring periodicity is each FFP, and the first information to be monitored within each FFP is at least one of COT indication information, an initial signal, a preamble signal, and the like. The terminal may determine whether a base station has obtained a channel transmission occasion and performed transmission by monitoring for the first information.

Optionally, the second terminal behavior may include: in a case that the terminal detects no first information within the monitoring periodicity, transmitting a first uplink transmission that is within the monitoring periodicity, that is, at least one of a configured uplink transmission and a dynamic scheduled uplink transmission. For the second terminal behavior, the first information may be at least one of the following: an SFI transmitted through a PDCCH (that is, an SFI PDCCH), COT indication information, an initial signal, a preamble signal, and the like. The configured uplink transmission may be configured by using higher layer signaling such as RRC signaling, for example, transmitted through any one of an SRS, PUCCH, PUSCH and PRACH that is configured by using higher layer signaling. The dynamic scheduled uplink transmission is applicable to a cross-FFP scheduling, which means that scheduling information corresponding to an uplink transmission is received in an FFP before the FFP in which the uplink transmission is located. The dynamic scheduled uplink transmission may include a PUSCH, a PUCCH, an aperiodic SRS or the like, that is scheduled dynamically.

In an implementation, for the second terminal behavior, the corresponding monitoring periodicity is an SFI monitoring periodicity. The SFI monitoring periodicity is, for example, a PDCCH monitoring periodicity for DCI format 2_0; and the first information to be monitored within the SFI monitoring periodicity is an SFI PDCCH. In addition, if the SFI is transmitted through a group-common PDCCH (for example, DCI format 2_0), the SFI monitoring periodicity is a monitoring periodicity of the group-common PDCCH corresponding to the SFI.

In another implementation, for the second terminal behavior, the corresponding monitoring periodicity is each FFP, and the first information to be monitored within each FFP is at least one of COT indication information, an initial signal, a preamble signal, and the like. The terminal may determine whether a base station has obtained a channel transmission occasion and performed transmission by monitoring for the first information.

It should be noted that, for the second terminal behavior, the terminal also needs to depend on a listen before talk (LBT) result before transmitting the configured uplink transmission and/or the dynamic scheduled uplink transmission, which means that the terminal can perform the corresponding uplink transmission only when a channel is detected clear; otherwise, the terminal cannot perform the corresponding uplink transmission.

Optionally, for the second terminal behavior, in a case that a frame based equipment (FBE) operation is performed, that is, the terminal is an FBE, the transmitting the first uplink transmission that is within the monitoring periodicity includes: setting to start transmitting the configured uplink transmission from a fixed frame period FFP starting position, or scheduling to start transmitting the dynamic scheduled uplink transmission from an FFP starting position. It should be noted that this configured or scheduled transmission starting from an FFP starting position may only be a transmission requirement for the second terminal behavior, and no such a transmission requirement exists for the first terminal behavior.

Optionally, regardless of the first terminal behavior or the second terminal behavior, the terminal may monitor for an SFI PDCCH within an SFI monitoring periodicity in a case that any one of the following is satisfied:

for a serving cell in which the configured uplink transmission is located, the terminal is configured to monitor for the SFI PDCCH, and the configured uplink transmission is configured on a flexible symbol of a semi-static slot format (uplink UL/downlink DL) configuration; and for a serving cell in which the configured uplink transmission is located, the terminal is configured to monitor for the SFI PDCCH, and the terminal has no semi-static slot format configuration.

The semi-static slot format configuration refers to an uplink UL/downlink DL configuration performed by using higher layer signaling. One slot format may include downlink symbols, uplink symbols, and flexible symbols. For example, the semi-static slot format configuration may be configured by using a higher layer parameter tdd-UL-DL-ConfigurationCommon and/or tdd-UL-DL-Configuration-Dedicated.

It should be noted that for the serving cell in which the configured uplink transmission is located, the terminal being configured to monitor for the SFI PDCCH means that according to a configuration in higher layer signaling, the terminal needs to monitor for the SFI PDCCH transmitted for the serving cell in which the configured uplink transmission is located, and does not means that an SFI PDCCH is configured on the serving cell in which the configured uplink transmission is located. The serving cell in which the SFI PDCCH is located is a scheduling cell corresponding to the serving cell in which the configured uplink transmission is located, and may be the same as or different from the serving cell in which the configured uplink transmission is located.

In an implementation, for example, in wireless accessing (NR) to an unpaired spectrum or time division duplexing (TDD) system, a network device such as a base station may perform a semi-static UL/DL configuration on the terminal by using cell-specific higher layer signaling, or may perform a semi-static UL/DL configuration on the terminal by using UE-specific higher layer signaling. With the semi-static UL/DL configuration, each symbol of each slot may be configured as a downlink symbol (DL symbol), an uplink symbol (UL symbol), or a flexible symbol. DL symbols can only be used for downlink transmission, UL symbols can only be used for uplink transmission, and flexible symbols can be used for either uplink transmission or downlink transmission. In addition, a base station may also perform a dynamic UL/DL configuration on the terminal by using a dynamic SFI transmitted through a group-common physical downlink control channel (group-common PDCCH). If the base station performs a semi-static UL/DL configuration on the terminal, for a DL symbol or UL symbol indicated by the semi-static UL/DL configuration, a dynamic SFI must be indicated as a DL symbol or a UL symbol, and for a flexible symbol indicated by the semi-static UL/DL configuration, a dynamic SFI can be indicated as a DL symbol, a UL symbol, or a flexible symbol, which means that a dynamic SFI can only modify a flexible symbol indicated by the semi-static DL/UL configuration, and cannot change a DL symbol and a UL symbol indicated by the semi-static DL/UL configuration.

It can be understood that the embodiments of this application may be mainly applied to a system including an unlicensed band, and both a terminal and a network device in the system can support transmission an unlicensed band.

In addition, to ensure an uplink transmission performed by the terminal, in a case that a conflict occurs between an uplink configuration and a configured downlink reception (for example, the two are in a same serving cell, and overlap in time) of the terminal, the terminal in the embodiments of this application can still perform the uplink transmission.

The following describes this application in detail with reference to specific examples.

Embodiment 1

In Embodiment 1, a network system uses an FBE. UE in a connected state (CONNECTED) is configured with a corresponding FFP, and is configured to monitor for at least one of COT indication information, an initial signal and a preamble signal within each FFP. If the UE detects at least one of the COT indication information, the initial signal and the preamble signal, the UE can perform an uplink transmission or a downlink reception according to indication content of the at least one of the COT indication information, the initial signal and the preamble signal. If within an FFP, the UE does not detect at least one of the COT indication information, the initial signal and the preamble signal, and the UE has a configured uplink transmission in the FFP, the UE may cancel transmitting the configured uplink transmission.

Figure 2:
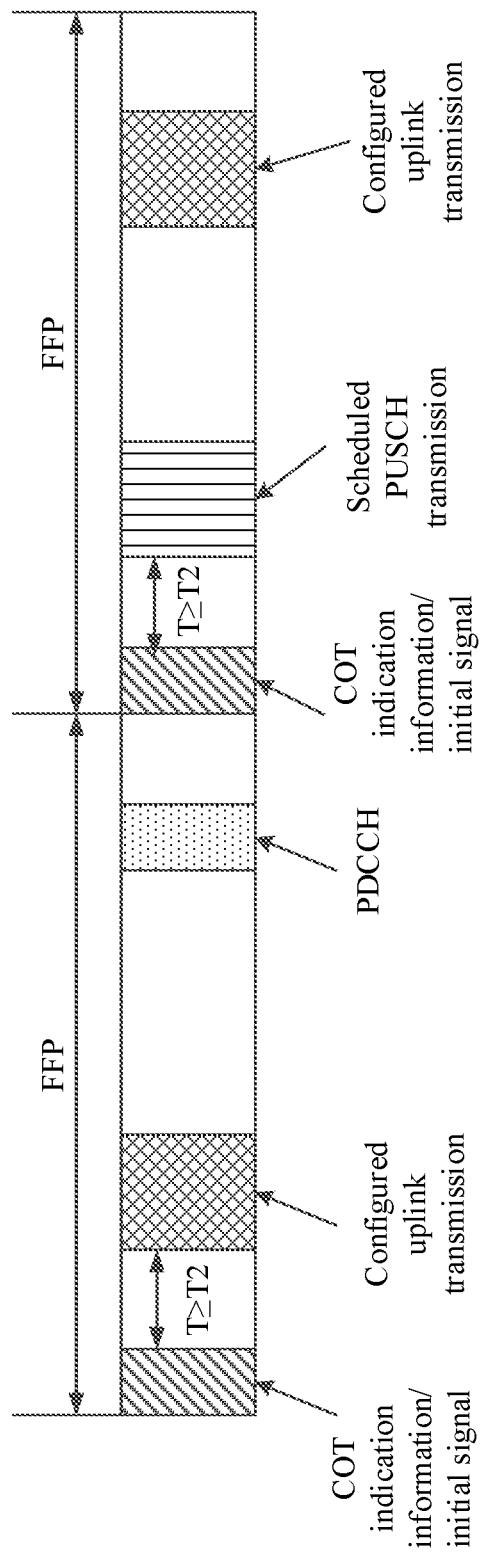
FIG. 2 is a schematic diagram of transmission in Example 1 of this application.

If the UE supports a cross-FFP scheduling, as shown in FIG. 2, the UE receives a PDCCH in a first FFP, and schedules the UE to transmit a PUSCH in a second FFP, but at the beginning of the second FFP, the UE does not detect at least one of the COT indication information, the initial signal and the preamble signal, that corresponds to the FFP, the UE may cancel transmitting the scheduled PUSCH transmission.

It can be understood that some processing time is required when the UE cancels transmitting the configured uplink transmission or the scheduled uplink transmission. Therefore, as shown in FIG. 2, when the UE cancels transmitting the configured uplink transmission or the scheduled uplink transmission, the UE cancels an uplink transmission that is some time after the COT indication information or an end position of the initial signal (for example, T≥T2). The time may be related to the processing capability of the UE.

Embodiment 2

Figure 3:
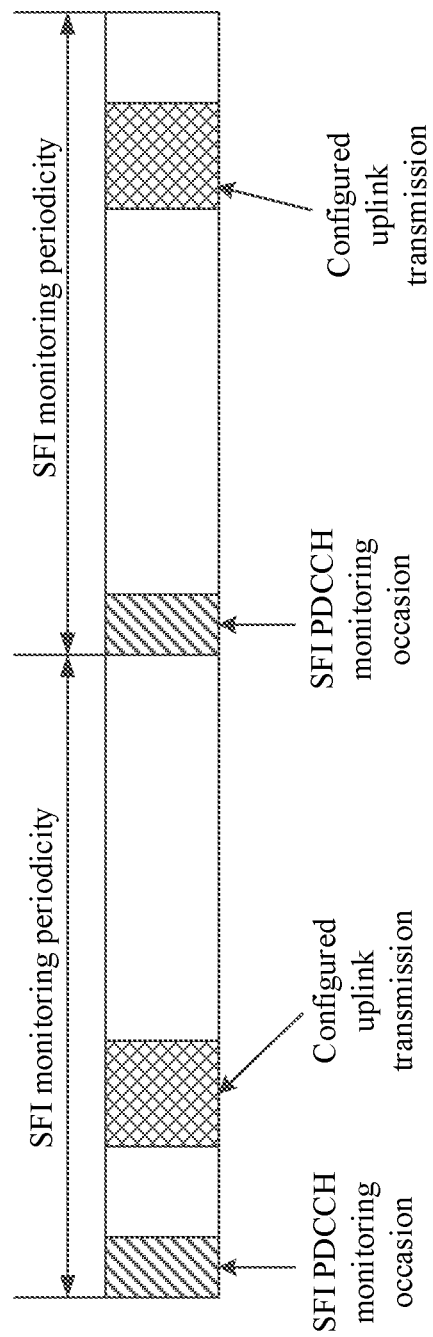
FIG. 3 is a schematic diagram of transmission in Example 2 of this application.

In Embodiment 2, a network system uses an FBE. UE in a connected state (CONNECTED) is configured to monitor for an SFI PDCCH, and the UE has no semi-static slot format configuration, that is, no tdd-UL-DL-Configuration-Common and/or tdd-UL-DL-ConfigurationDedicated; or the UE is configured to monitor for an SFI PDCCH, and the configured uplink transmission is configured on a flexible symbol indicated by a semi-static slot format configuration. As shown in FIG. 3, if the UE detects no SFI PDCCH on an SFI PDCCH monitoring occasion in an SFI monitoring periodicity, the UE may perform clear channel detection before transmitting the configured uplink transmission; if a channel is detected clear, the UE transmits the configured uplink transmission; or if the channel is detected busy, the UE does not transmit the configured uplink transmission.

Embodiment 3

When UE is configured with carrier aggregation (CA), the UE may receive or transmit on a plurality of component carriers, and the UE needs to know which component carrier DCI corresponds to. The information may be implicit or explicit, which depends on whether cross-carrier scheduling is used. The cross-carrier scheduling is implemented independently for each component carrier of each UE by using RRC signaling. Whether to use cross-carrier scheduling is configured by higher layer signaling.

For non cross-carrier scheduling, a PDCCH is configured on each component carrier, and downlink scheduling information on the component carrier is specific to that component carrier. For an uplink grant, there is an association between an uplink component carrier and a downlink component carrier, each uplink component carrier corresponds to an associated downlink component carrier, and such association information is part of system information. Therefore, from the association between the uplink component carrier and the downlink component carrier, the UE may know which uplink component carrier the DCI is specific to. During cross-carrier scheduling, a downlink PDSCH or an uplink PUSCH is transmitted on an associated component carrier instead of a component carrier on which the PDCCH is located. A CIF (carrier indicator field) field in the PDCCH indicates information of the component carrier used by the downlink PDSCH and the uplink PUSCH.

Figure 4:
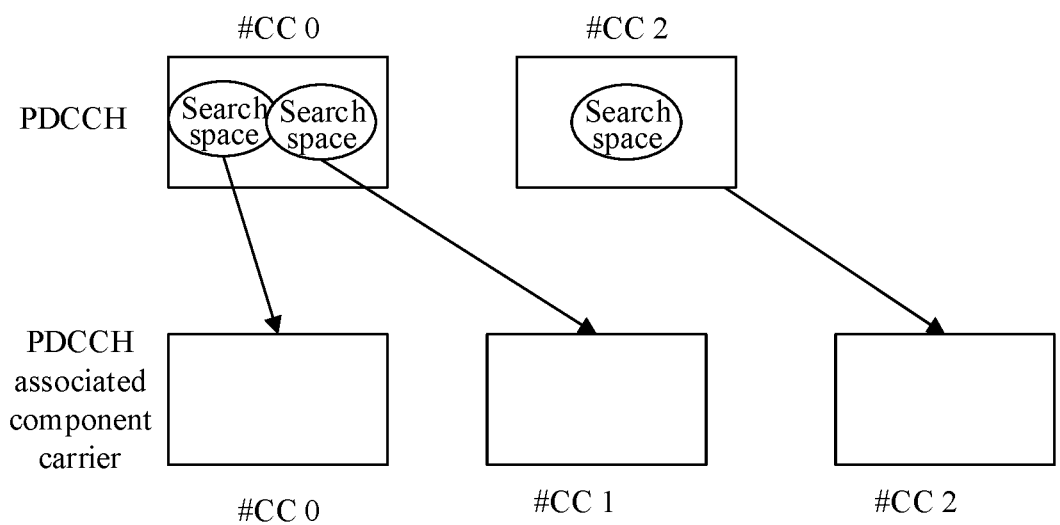
FIG. 4 is a schematic diagram of component carriers in Example 3 of this application.

Regardless of the scheduling manner, each component carrier has an associated component carrier, and corresponding DCI is transmitted on this component carrier, which is configured by RRC signaling. This means that a base station configures a scheduling cell for each serving cell, as shown in FIG. 4.

In this Example 3, the UE may determine, based on whether a serving cell in which the first information is located is a licensed band, to use either the first terminal behavior or the second terminal behavior; or the UE may determine, based on whether a serving cell in which a configured or scheduled uplink transmission is located is a licensed band, to use either the first terminal behavior or the second terminal behavior. The first information may be at least one of the following: an SFI PDCCH, COT indication information, an initial signal, a preamble signal, and the like.

It should be noted that when the serving cell in which the first information is located is an unlicensed band, whether the first information can be transmitted depends on an LBT result. Therefore, when the base station performs an LBT and detects that the channel is busy, the base station cannot transmit the first information. In this case, to increase uplink transmission occasions of the terminal, when the terminal detects no corresponding first information, the terminal can perform an LBT before transmitting the configured uplink transmission. If a channel is detected clear, the configured uplink transmission is transmitted; otherwise, the configured uplink transmission is not transmitted.

Embodiment 4

Figure 5:
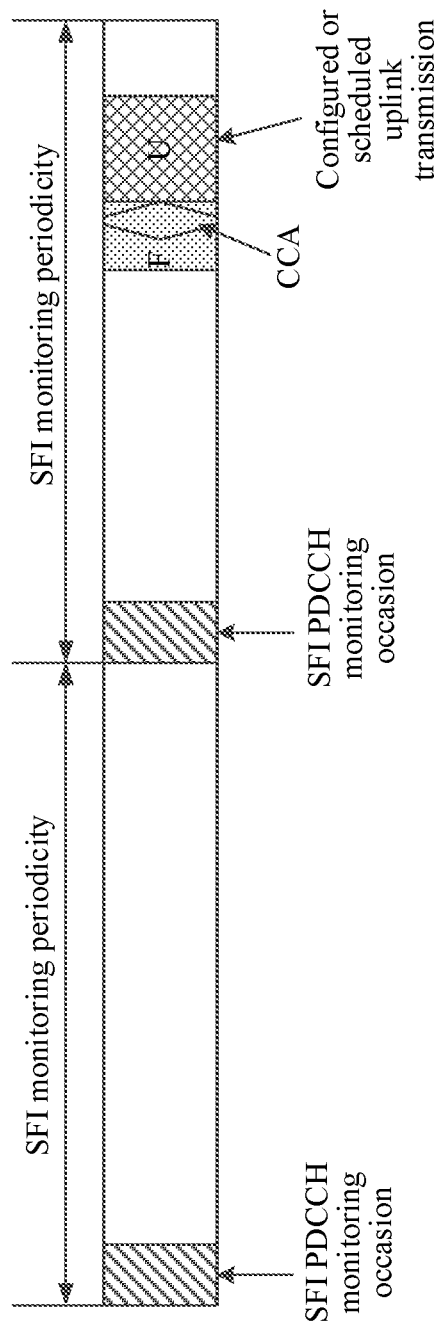
FIG. 5 is a schematic diagram of transmission in Example 4 of this application.

In this Embodiment 4, as shown in FIG. 5, UE is configured with a semi-static slot format configuration, that is, with tdd-UL-DL-ConfigurationCommon and/or tdd-UL-DL-ConfigurationDedicated, and the UE in the serving cell is configured to monitor for a dynamic SFI, where the configured uplink transmission is configured on the UL symbol indicated by the dynamic SFI, the scheduled uplink transmission is scheduled on the UL symbol and/or flexible symbol indicated by the dynamic SFI, and the flexible symbol indicated by the dynamic SFI is before a starting symbol of the configured or scheduled uplink transmission (according to existing regulations, on the flexible symbol indicated by the dynamic SFI, if the UE has no downlink reception or uplink transmission scheduled by the DCI, the UE neither transmits nor receives). Because the UE needs to perform clear channel assessment (CCA) before performing the configured or scheduled uplink transmission, the UE needs to receive a corresponding signal (even on the flexible symbol indicated by the dynamic SFI) to determine whether the current channel is available.

Embodiment 5

Figure 6:
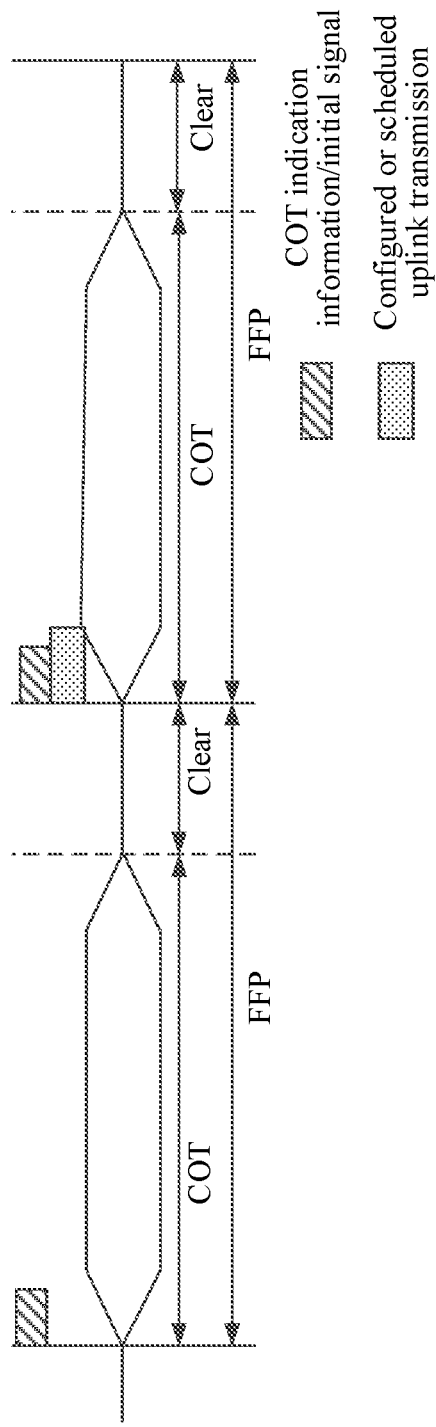
FIG. 6 is a schematic diagram of transmission in Example 5 of this application.

In this Embodiment 5, a network system uses an FBE. As shown in FIG. 6, for a serving cell, on an occasion, the configured or scheduled uplink transmission and at least one of COT indication information, an initial signal and a preamble signal are configured or scheduled on a starting position of an FFP, so that time-domain resources for the configured or scheduled uplink transmission and the at least one of COT indication information, an initial signal and a preamble signal overlap. Because UE can only perform downlink reception or uplink transmission at the same occasion, but not perform both simultaneously, a UE behavior needs to be defined. In this case, the uplink transmission can be prioritized, that is, the UE performs uplink transmission, without receiving downlink COT indication information and/or an initial signal, which can improve uplink transmission throughput and reduce uplink transmission delay of the UE.

The foregoing embodiments describe the uplink transmission method of this application, and the following describes a terminal corresponding to the uplink transmission method of this application with reference to embodiments and accompanying drawings.

Figure 7:
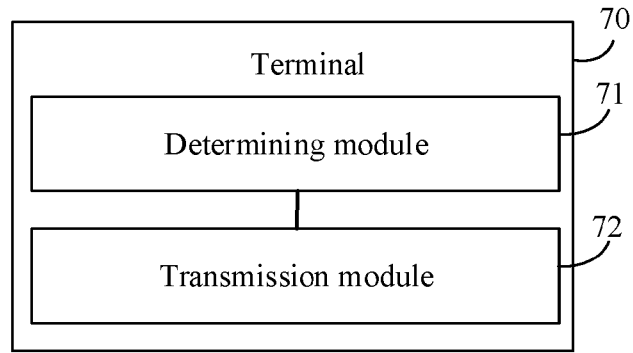
FIG. 7 is a first schematic structural diagram of a terminal according to an embodiment of this application.

FIG. 7 is a schematic structural diagram of a terminal according to an embodiment of this application. As shown in FIG. 7, the terminal 70 includes:

a determining module 71, configured to determine, based on at least one of the following, a terminal behavior pattern: configuration information of the terminal, received downlink control information, whether a serving cell in which first information is located is a licensed band, and whether a serving cell in which a first uplink transmission is located is a licensed band, where the first information is information to be monitored by the terminal within a monitoring periodicity, and the first uplink transmission is at least one of a configured uplink transmission and a dynamic scheduled uplink transmission; and a transmission module 72, configured to perform an uplink transmission based on the terminal behavior pattern.

Optionally, the terminal behavior pattern may be any one of a first terminal behavior and a second terminal behavior.

The first terminal behavior includes: in a case that the terminal detects no first information within the monitoring periodicity, canceling transmitting a first uplink transmission that is within the monitoring periodicity, that is, at least one of a configured uplink transmission and a dynamic scheduled uplink transmission.

The second terminal behavior includes: in a case that the terminal detects no first information within the monitoring periodicity, transmitting a first uplink transmission that is within the monitoring periodicity, that is, at least one of a configured uplink transmission and a dynamic scheduled uplink transmission.

Optionally, when determining, based on whether a serving cell in which the first information is located is a licensed band, the terminal behavior pattern, in a case that the serving cell in which the first information is located is a licensed band, determining that the terminal behavior pattern is the first terminal behavior; or in a case that the serving cell in which the first information is located is an unlicensed band, determining that the terminal behavior pattern is the second terminal behavior.

Optionally, when determining, based on whether a serving cell in which the first uplink transmission is located is a licensed band, the terminal behavior pattern, in a case that the serving cell in which the first uplink transmission is located is a licensed band, determining that the terminal behavior pattern is the first terminal behavior; or in a case that the serving cell in which the first uplink transmission is located is an unlicensed band, determining that the terminal behavior pattern is the second terminal behavior.

Optionally, the monitoring periodicity is an SFI monitoring periodicity; and the first information is an SFI transmitted through a PDCCH.

Optionally, in a case that any one of the following is satisfied, the terminal monitors an SFI transmitted through the PDCCH within the SFI monitoring periodicity:

for a serving cell in which the configured uplink transmission is located, the terminal is configured to monitor for the SFI transmitted through the PDCCH, and the configured uplink transmission is configured on a flexible symbol indicated by a semi-static slot format configuration; and for a serving cell in which the configured uplink transmission is located, the terminal is configured to monitor for the SFI transmitted through the PDCCH, and the terminal has no semi-static slot format configuration.

Optionally, in a case that a frame based equipment FBE operation is performed, the transmitting a first uplink transmission that is within the monitoring periodicity includes:

setting to start transmitting the configured uplink transmission from a fixed frame period FFP starting position;

or, scheduling to start transmitting the dynamic scheduled uplink transmission from an FFP starting position.

Optionally, the transmission module 72 is further configured to: in a case that a conflict occurs between an uplink transmission and a configured downlink reception in the terminal, perform the uplink transmission.

It can be understood that the terminal 70 in this embodiment of this application can implement the processes of the method embodiment in FIG. 1, with the same beneficial effects achieved. To avoid repetition, details are not described herein again.

An embodiment of this application further provides a terminal, including a processor, a memory, and a computer program stored in the memory and capable of running on the processor, where when the computer program is executed by the processor, the processes of the foregoing embodiments of the uplink transmission method shown in FIG. 1 are implemented, with the same technical effect achieved. To avoid repetition, details are not described herein again.

Figure 8:
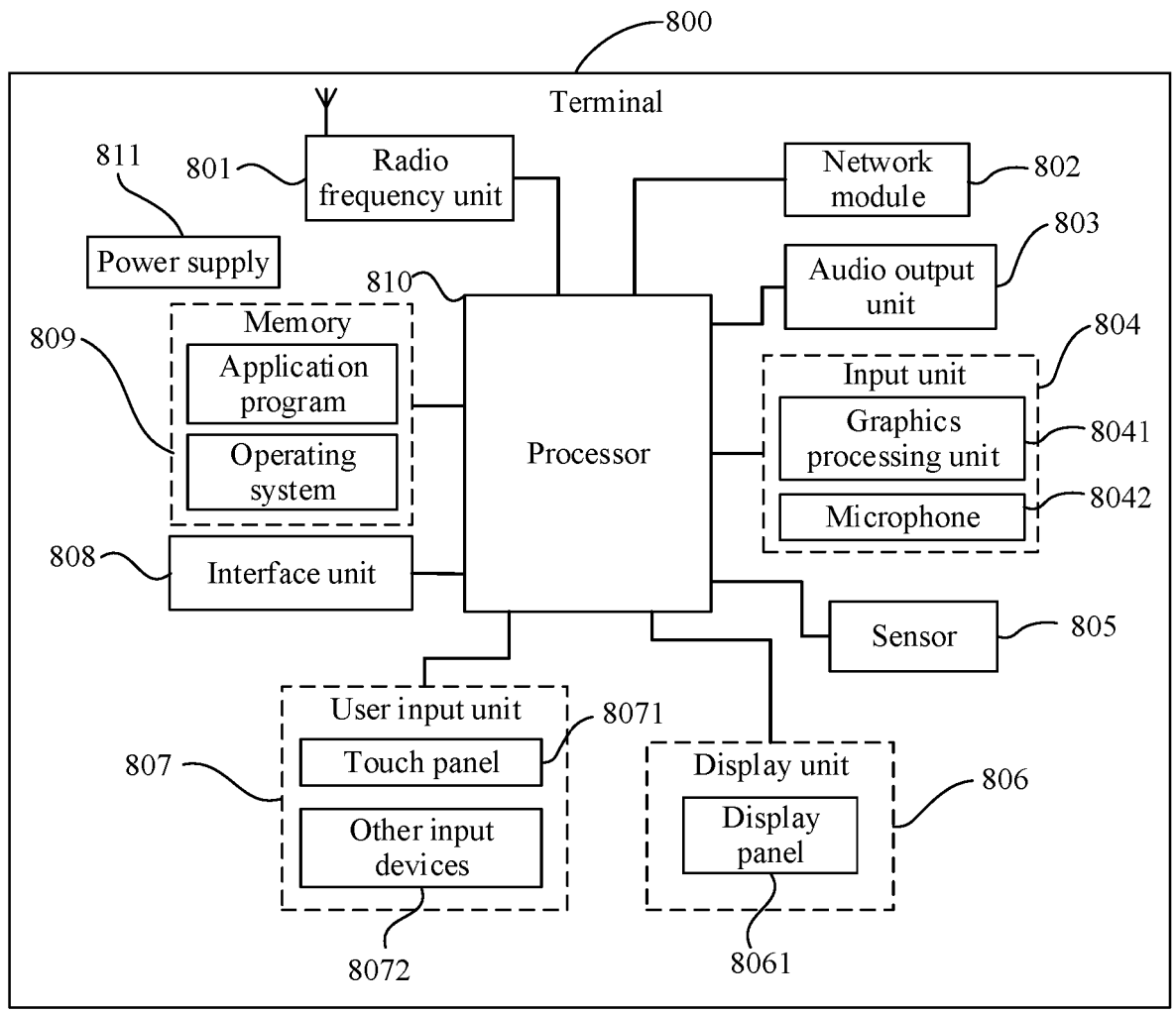
FIG. 8 is a second schematic structural diagram of a terminal according to an embodiment of this application.

FIG. 8 is a schematic diagram of a hardware structure of a terminal for implementing the embodiments of this application. The terminal 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that the structure of the terminal shown in FIG. 8 does not constitute a limitation on the terminal. A quantity of components included in the terminal may be greater or less than that shown in the figure, or some components are combined, or component arrangements are different. In this embodiment of this application, the terminal includes but is not limited to a mobile phone, a tablet computer, a notebook computer, a palmtop computer, a vehicle-mounted terminal, a wearable device, a pedometer, or the like.

The processor 810 is configured to determine, based on at least one of the following, a terminal behavior pattern: configuration information of the terminal 800, received downlink control information, whether a serving cell in which first information is located is a licensed band, and whether a serving cell in which a first uplink transmission is located is a licensed band, where the first information is information to be monitored by the terminal within a monitoring periodicity, and the first uplink transmission is at least one of a configured uplink transmission and a dynamically scheduled uplink transmission.

The radio frequency unit 801 is configured to perform an uplink transmission based on the terminal behavior pattern.

The terminal 800 in this embodiment of this application can implement the processes of the method embodiment in FIG. 1, with the same beneficial effects achieved. To avoid repetition, details are not described herein again.

It should be understood that in this embodiment of this application, the radio frequency unit 801 may be configured to receive and transmit information, or to receive and transmit a signal in a call process, and specifically, after receiving downlink data from a base station, transmit the downlink data to the processor 810 for processing; and also transmit uplink data to the base station. Generally, the radio frequency unit 801 includes but is not limited to an antenna, at least one amplifier, a transceiver, a coupler, a low noise amplifier, a duplexer, and the like. In addition, the radio frequency unit 801 may also communicate with a network and other devices via a wireless communications system.

The terminal provides wireless broadband internet access for a user by using the network module 802, for example, helps the user send and receive e-mails, browse web pages, and access streaming media.

The audio output unit 803 may convert audio data into an audio signal, and output the audio signal as sound, where the audio data is received by the radio frequency unit 801 or the network module 802, or stored in the memory 809. In addition, the audio output unit 803 may further provide audio output (for example, a call signal received tone or a message received tone) that is related to a specific function performed by the terminal 800. The audio output unit 803 includes a speaker, a buzzer, a receiver, and the like.

The input unit 804 is configured to receive an audio or video signal. The input unit 804 may include a graphics processing unit (GPU) 8041 and a microphone 8042, and the graphics processing unit 8041 processes image data of a static picture or a video obtained by an image capture apparatus (for example, a camera) in an image capture mode or a video capture mode. A processed image frame may be displayed on the display unit 806. The image frame processed by the graphics processing unit 8041 may be stored in the memory 809 (or another storage medium) or transmitted by using the radio frequency unit 801 or the network module 802. The microphone 8042 is capable of receiving sounds and processing such sounds into audio data. The processed audio data can be converted in a telephone call mode into a format that can be transmitted by the radio frequency unit 801 to a mobile communication base station, for outputting.

The terminal 800 may further include at least one sensor 805, for example, an optical sensor, a motion sensor, and other sensors. Specifically, the optical sensor may include an ambient light sensor and a proximity sensor. The ambient light sensor may adjust luminance of the display panel 8061 based on brightness of ambient light, and the proximity sensor may turn off the display panel 8061 and/or backlight when the terminal 800 moves close to an ear. As a motion sensor, an accelerometer sensor may detect magnitudes of accelerations in various directions (typically three axes), and in a stationary state, may detect the magnitude and direction of gravity, and may be applied for terminal posture recognition (for example, switching between a landscape orientation and a portrait orientation, related gaming, and magnetometer posture calibration), vibration recognition related functions (for example, pedometer and tapping), and the like. The sensor 805 may further include a fingerprint sensor, a pressure sensor, an iris sensor, a molecular sensor, a gyroscope, a barometer, a hygrometer, a thermometer, an infrared sensor, and the like. Details are not described herein.

The display unit 806 is configured to display information input by the user or information provided for the user. The display unit 806 may include the display panel 8061. The display panel 8061 may be configured in a form of a liquid crystal display (LCD), an organic light-emitting diode (OLED), or the like.

The user input unit 807 may be used to receive input digit or character information, and generate key signal input that is related to user setting and function control of the terminal. Specifically, the user input unit 807 includes a touch panel 8071 and other input devices 8072. The touch panel 8071, or referred to as a touchscreen, may capture a touch operation performed by a user on or near the touch panel 8071 (for example, an operation performed by the user on the touch panel 8071 or near the touch panel 8071 by using any appropriate object or accessory such as a finger or a stylus). The touch panel 8071 may include two parts: a touch detection apparatus and a touch controller. The touch detection apparatus detects a touch direction of a user, detects a signal brought by a touch operation, and transmits the signal to the touch controller. The touch controller receives touch information from the touch detection apparatus, converts the touch information into touch point coordinates, transmits the touch point coordinates to the processor 810, and receives and executes a command transmitted by the processor 810. In addition, the touch panel 8071 may be implemented in a plurality of forms, for example, as a resistive, capacitive, infrared, or surface acoustic wave touch panel. In addition to the touch panel 8071, the user input unit 807 may further include other input devices 8072. Specifically, the other input devices 8072 may include but are not limited to a physical keyboard, a function key (for example, a volume control key or a switch key), a trackball, a mouse, and a joystick. Details are not described herein.

Further, the touch panel 8071 may cover the display panel 8061. When detecting a touch operation on or near the touch panel 8071, the touch panel 8071 transmits the touch operation to the processor 810 to determine a type of a touch event. Then, the processor 810 provides a corresponding visual output on the display panel 8061 based on the type of the touch event. Although the touch panel 8071 and the display panel 8061 are used as two independent components to implement input and output functions of the terminal in FIG. 8, the touch panel 8071 and the display panel 8061 may be integrated to implement the input and output functions of the terminal in some embodiments. This is not specifically limited herein.

The interface unit 808 is an interface between an external apparatus and the terminal 800. For example, the external apparatus may include a wired or wireless headphone port, an external power (or battery charger) port, a wired or wireless data port, a memory card port, a port for connecting an apparatus with an identification module, an audio input/output (I/O) port, a video I/O port, or an earphone port. The interface unit 808 may be configured to receive an input (for example, data information or power) from the external apparatus and transmit the received input to one or more elements within the terminal 800, or may be configured to transmit data between the terminal 800 and the external apparatus.

The memory 809 may be configured to store software programs and various data. The memory 809 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 809 may include a high-speed random access memory, and may further include a non-volatile memory such as a disk storage device, a flash memory device, or another volatile solid-state storage device.

The processor 810 is a control center of the terminal, and is connected to all components of the terminal by using various interfaces and lines. By running or executing software programs and/or modules that are stored in the memory 809 and calling data stored in the memory 809, the processor 810 executes various functions of the terminal and processes data, so as to perform overall monitoring on the terminal. The processor 810 may include one or more processing units. Preferably, an application processor and a modem processor may be integrated into the processor 810. The application processor mainly processes an operating system, a user interface, an application program, and the like. The modem processor mainly processes wireless communication. It may be understood that the modem processor may alternatively not be integrated in the processor 810.

The terminal 800 may further include a power supply 811 (for example, a battery) that supplies power to the components. Optionally, the power supply 811 may be logically connected to the processor 810 through a power management system, so as to implement functions such as charging management, discharging management, and power consumption management through the power management system.

In addition, the terminal 800 may further include some functional modules that are not shown. Details are not described herein.

An embodiment of this application further provides a computer-readable storage medium, where the computer-readable storage medium stores a computer program, and when the computer program is executed by a processor, the processes of the foregoing embodiments of the uplink transmission method shown in FIG. 1 may are implemented, with the same technical effects achieved. To avoid repetition, details are not described herein again. The computer-readable storage medium may be a read-only memory (ROM), a random access memory (RAM), a magnetic disk, an optical disc, or the like.

It should be noted that the terms "comprise", "include", or any of their variants in this specification are intended to cover a non-exclusive inclusion, such that a process, method, article, or apparatus that includes a list of elements includes not only those elements but also other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a preferred implementation. Based on such an understanding, the technical solutions of this application essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing implementations. The foregoing embodiments are only illustrative rather than restrictive. Inspired by this application, a person of ordinary skill in the art can still derive many variations without departing from the essence of this application and the protection scope of the claims. All these variations shall fall within the protection of this application.

What is claimed is:

1. An uplink transmission method, applied to a terminal, wherein first information is information to be monitored by the terminal within a monitoring periodicity, and a first uplink transmission is a configured uplink transmission and the method comprises:
   determining, based on at least one of the following, a terminal behavior pattern: configuration information of the terminal, received downlink control information, and whether a serving cell in which the first uplink transmission is located is a licensed band, wherein the configuration information of the terminal is radio resource control (RRC) information; and
   performing an uplink transmission based on the terminal behavior pattern;
   wherein the terminal behavior pattern is any one of a first terminal behavior and a second terminal behavior; wherein
   the first terminal behavior comprises: in a case that the terminal does not detect the first information within the monitoring periodicity, not transmitting the first uplink transmission; and
   the second terminal behavior comprises: in a case that the terminal does not detect the first information within the monitoring periodicity, transmitting the first uplink transmission;
   wherein
   the monitoring periodicity is a slot format indicator (SFI) monitoring periodicity; and
   the first information is an SFI transmitted through a physical downlink control channel (PDCCH).

2. The method according to claim 1, wherein in a case that any one of the following is satisfied, the terminal monitors the SFI transmitted through the PDCCH within the SFI monitoring periodicity:
   for a serving cell in which the configured uplink transmission is located, the terminal is configured to monitor for the SFI transmitted through the PDCCH, and the configured uplink transmission is configured on a flexible symbol indicated by a semi-static slot format configuration; and
   for a serving cell in which the configured uplink transmission is located, the terminal is configured to monitor for the SFI transmitted through the PDCCH, and the terminal has no semi-static slot format configuration.

3. The method according to claim 1, wherein
the method further comprises: in a case that a conflict occurs between an uplink transmission and a configured downlink reception in the terminal, performing the uplink transmission.

4. The method according to claim 1, wherein the configured uplink transmission comprises at least one of following: sounding reference signal (SRS) configured by using higher layer signaling, physical uplink control channel (PUCCH) configured by using the higher layer signaling, physical uplink shared channel (PUSCH) configured by using the higher layer signaling or physical random access channel (PRACH) configured by using the higher layer signaling.

5. The method according to claim 1, wherein the first information is transmitted through downlink control information (DCI) format 2_0.

6. The method according to claim 1, wherein the method further comprises: determining the terminal behavior pattern based on whether a serving cell in which the first information is located is a licensed band.

7. A terminal, comprising a memory, a processor, and a computer program stored in the memory and capable of running on the processor, wherein when the computer program is executed by the processor, an uplink transmission method is implemented, first information is information to be monitored by the terminal within a monitoring periodicity, and a first uplink transmission is a configured uplink transmission and the method comprises:
  determining, based on at least one of the following, a terminal behavior pattern: configuration information of the terminal, received downlink control information, and whether a serving cell in which the first uplink transmission is located is a licensed band, wherein the configuration information of the terminal is radio resource control (RRC) information; and
  performing an uplink transmission based on the terminal behavior pattern;
  wherein the terminal behavior pattern is any one of a first terminal behavior and a second terminal behavior; wherein
  the first terminal behavior comprises: in a case that the terminal does not detect the first information within the monitoring periodicity, not transmitting the first uplink transmission; and
  the second terminal behavior comprises: in a case that the terminal does not detect the first information within the monitoring periodicity, transmitting the first uplink transmission;
  wherein
  the monitoring periodicity is a slot format indicator (SFI) monitoring periodicity; and
  the first information is an SFI transmitted through a physical downlink control channel (PDCCH).

8. The terminal according to claim 7, wherein in a case that any one of the following is satisfied, the terminal monitors the SFI transmitted through the PDCCH within the SFI monitoring periodicity:
  for a serving cell in which the configured uplink transmission is located, the terminal is configured to monitor for the SFI transmitted through the PDCCH, and the configured uplink transmission is configured on a flexible symbol indicated by a semi-static slot format configuration; and
  for a serving cell in which the configured uplink transmission is located, the terminal is configured to monitor for the SFI transmitted through the PDCCH, and the terminal has no semi-static slot format configuration.

9. The terminal according to claim 7, wherein
the method further comprises: in a case that a conflict occurs between an uplink transmission and a configured downlink reception in the terminal, performing the uplink transmission.

10. The terminal according to claim 7, wherein the configured uplink transmission comprises at least one of following: sounding reference signal (SRS) configured by using higher layer signaling, physical uplink control channel (PUCCH) configured by using the higher layer signaling, physical uplink shared channel (PUSCH) configured by using the higher layer signaling or physical random access channel (PRACH) configured by using the higher layer signaling.

11. The terminal according to claim 7, wherein the first information is transmitted through downlink control information (DCI) format 2_0.

12. The terminal according to claim 7, wherein the method further comprises: determining the terminal behavior pattern based on whether a serving cell in which the first information is located is a licensed band.

13. A non-transitory computer-readable storage medium, storing a computer program, wherein when the computer program is executed by a processor, an uplink transmission method is implemented, first information is information to be monitored by the terminal within a monitoring periodicity, and a first uplink transmission is a configured uplink transmission and the method comprises:
  determining, based on at least one of the following, a terminal behavior pattern: configuration information of the terminal, received downlink control information, and whether a serving cell in which the first uplink transmission is located is a licensed band, wherein the configuration information of the terminal is radio resource control (RRC) information; and
  performing an uplink transmission based on the terminal behavior pattern;
  wherein the terminal behavior pattern is any one of a first terminal behavior and a second terminal behavior; wherein
  the first terminal behavior comprises: in a case that the terminal does not detect the first information within the monitoring periodicity, not transmitting the first uplink transmission; and
  the second terminal behavior comprises: in a case that the terminal does not detect the first information within the monitoring periodicity, transmitting the first uplink transmission;
  wherein
  the monitoring periodicity is a slot format indicator (SFI) monitoring periodicity; and
  the first information is an SFI transmitted through a physical downlink control channel PDCCH).

14. The non-transitory computer-readable storage medium according to claim 13, wherein in a case that any one of the following is satisfied, the terminal monitors the SFI transmitted through the PDCCH within the SFI monitoring periodicity:
  for a serving cell in which the configured uplink transmission is located, the terminal is configured to monitor for the SFI transmitted through the PDCCH, and the configured uplink transmission is configured on a flexible symbol indicated by a semi-static slot format configuration; and for a serving cell in which the configured uplink transmission is located, the terminal is configured to monitor for the SFI transmitted through the PDCCH, and the terminal has no semi-static slot format configuration.

15. The non-transitory computer-readable storage medium according to claim 13, wherein the configured uplink transmission comprises at least one of following: sounding reference signal (SRS) configured by using higher layer signaling, physical uplink control channel (PUCCH) configured by using the higher layer signaling, physical uplink shared channel (PUSCH) configured by using the higher layer signaling or physical random access channel (PRACH) configured by using the higher layer signaling.

16. The non-transitory computer-readable storage medium according to claim 13, wherein the first information is transmitted through downlink control information (DCI) format 2_0.

17. The non-transitory computer-readable storage medium according to claim 13, wherein the method further comprises: determining the terminal behavior pattern based on whether a serving cell in which the first information is located is a licensed band.

* * * * *